(12) United States Patent
Higuchi

(10) Patent No.: US 7,194,904 B2
(45) Date of Patent: Mar. 27, 2007

(54) ANGULAR VELOCITY SENSOR

(75) Inventor: Hirofumi Higuchi, Okazaki (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 11/153,368

(22) Filed: Jun. 16, 2005

(65) Prior Publication Data

US 2006/0000280 A1 Jan. 5, 2006

(30) Foreign Application Priority Data

Jul. 2, 2004 (JP) .............................. 2004-196899

(51) Int. Cl.
*G01P 15/08* (2006.01)
(52) U.S. Cl. ................................. 73/504.12
(58) Field of Classification Search ............ 73/504.12, 73/504.14, 504.16
See application file for complete search history.

(56) References Cited

U.S. PATENT DOCUMENTS 6,509,670 B2 * 1/2003 Jeong et al. ............. 73/504.12

6,915,693 B2 * 7/2005 Kim et al. ............... 73/504.12

FOREIGN PATENT DOCUMENTS

JP A-2003-42767 2/2003

* cited by examiner

*Primary Examiner*—John E. Chapman
(74) *Attorney, Agent, or Firm*—Posz Law Group, PLC

(57) ABSTRACT

A vibration-type angular velocity sensor realizing a suitably vibrating state of the vibrators by canceling the displacement of the vibrators caused by the gravity. The angular velocity sensor comprises base portions, vibrators coupled to the base portions, exciting means for driving and vibrating the vibrators in the x-direction, and detection means which, when an angular velocity is applied while the vibrators are being driven and vibrated, detects the angular velocity based on the vibrations of the vibrators in the y-direction at right angles with the x-direction, the angular velocity sensor further comprising position adjusting means for so adjusting the positions of the vibrators as to cancel the amount of displacement by which the vibrators are displaced by the gravity in the direction of the gravity.

4 Claims, 4 Drawing Sheets

ANGULAR VELOCITY SENSOR

CROSS REFERENCE TO RELATED APPLICATION

This application is based upon, claims the benefit of priority of, and incorporates by reference the contents of, Japanese Patent Application No. 2004-196899 filed on Jul. 2, 2004.

FIELD OF THE INVENTION

This invention relates to an angular velocity sensor of the vibration type which drives and vibrates the vibrator by exciting means and, when the angular velocity is applied thereto, detects the angular velocity based on the vibration of the vibrator in a direction at right angles with the direction of the driving vibration.

BACKGROUND OF THE INVENTION

As the angular velocity sensor of the vibration type, there has been proposed the one provided with a base portion, a vibrator coupled to the base portion, exciting means for driving and vibrating the vibrator in a first direction, and detection means for detecting the angular velocity based on the vibration of the vibrator in a second direction at right angles with the first direction when the angular velocity is applied thereto while the vibrator is being driven and vibrated (see, for example, JP-A-2003-42767).

FIG. 4 is a diagram of a general angular velocity sensor 800 of this kind inclusive of a circuit portion 900.

The angular velocity sensor 800 illustrated in FIG. 4 comprises a semiconductor substrate 10 such as a silicon substrate in which trenches are formed relying on a known semiconductor production technology such as etching, thereby to form base portions 20 on the outer peripheral portion thereof, and to form two vibrators 30 and 40 as well as electrodes on the inner peripheral portion thereof in a sectionalized manner as shown in FIG. 1.

Here, the angular velocity sensor 800 has the vibrator that is constituted by the first vibrator 30 and the second vibrator 40 movably coupled to the base portions 20.

Further, the circuit portion 900 is formed on another IC chip that is not shown, or is the one obtained by integrally forming elements such as transistors in the semiconductor substrate 10 that constitutes the angular velocity sensor 800 relying upon the semiconductor production technology. The connection of the circuit portion 900 to base portions 20, vibrators 30, 40, and electrodes, can be accomplished by using the bonding wires or various wiring members.

The first vibrator (lower side in the drawing) 30 and the second vibrator (upper side in the drawing) 40 located on the inner periphery of the base portions 20, are arranged along the x-direction (first direction) in FIG. 1, and are both movable relative to the base portions 20.

The two vibrators 30 and 40 include frame portions 31, 41, rectangular portions 32, 42 of nearly a rectangular shape positioned on the inside of the frame portions 31, 41, and detection beams 33, 43 for coupling the frame portions 31, 41 to the rectangular portions 32, 42. The two vibrators 30, 40 are supported at their frame portions 31, 41 by being coupled to the base portions 20 through drive beams 50.

The drive beams 50 have a freedom in the x-direction (first direction) in FIG. 1, and the detection beams 33, 43 have a freedom in the y-direction (second direction) in FIG. 1.

The first vibrator 30 and the second vibrator 40 have exciting means provided on both sides of the vibrators 30, 40 along the x-direction for generating electrostatic force for driving and vibrating the two vibrators 30, 40 in the x-direction in opposite phases to each other.

Here, the exciting means are constituted by drive electrodes 34, 44, amplifiers 811, 812, 813, 814, and a drive signal generating circuit 820 in the circuit portion 800.

In the exciting means, the drive voltage is applied to the drive electrodes 34, 44 from the drive signal generating circuit 820 and the amplifiers 811 to 814. The drive voltage is an AC voltage such as of a sine wave or a rectangular wave.

The vibrators 30 and 40 are constituted so that AC voltages of opposite phases are applied to the drive electrodes 34, 44 of both sides. Namely, the vibrators 30 and 40 are driven and vibrated in the x-direction (drive direction x) in opposite phases to each other due to the electrostatic forces.

Referring to FIG. 4, further, detection means are provided for the vibrators 30 and 40 being coupled to the base portions 20 for detecting the angular velocity. The detection means are constituted by detection electrodes 60, 70, and C/V converters 931, 932, 933, 934 in the circuit portion 900.

When an angular velocity is applied about the z-axis (detection axis) in FIG. 4 while the vibrators 30, 40 are being driven and vibrated, the vibrators 30 and 40 vibrate in the y-direction (detection direction y) at right angles with the x-direction due to the Coriolis' force. Due to the vibration of the vibrators 30 and 40 in the y-direction, the capacitances vary between the detection electrodes 60, 70 and the rectangular portions 32, 42 of the vibrators 30, 40 facing the detection electrodes 60, 70. Variations in the capacitances are converted into voltages through the C/V converters 931 to 934 and are output.

Here, a differential output between the two C/V converters 931 and 932 in the first vibrator 30, is obtained and, further, a differential output between the two C/V converters 933 and 934 in the second vibrator 40, is obtained. Further, a difference between these two differential outputs is obtained and is output as an angular velocity signal. Therefore, due to the first and second vibrators 30 and 40 driven and vibrated in opposite phases relative to each other, there is obtained an angular velocity signal canceling the acceleration component in the y-direction.

Referring to FIG. 4, the circuit portion 900 of the angular velocity sensor 800 is provided with constant potential portions 940 maintaining the vibrators 30, 40 at predetermined potentials. The constant potential portions 940 are electrically connected to the base portions 20 that are supporting the frame portions 31, 41 of the vibrators 30, 40.

Here, if the above angular velocity sensor 800 is used for detecting the angular velocity about the vertical axis, i.e., for detecting the yaw rate, the drive direction x of the vibrators 30, 40 and the detection direction y on which the Coriolis' force acts are set on a horizontal plane to be perpendicular to each other. Therefore, the vibrators 30 and 40 are driven and vibrated uniformly toward the right and left.

When the angular velocity sensor 800 is used for detecting, for example, the angular velocity about the axis in the back-and-forth direction, i.e., roll rate and the angular velocity about the axis in the right-and-left direction, i.e., pitch rate other than the yaw rate, the detection axis (the above z-axis) about which the angular velocity occurs is on the horizontal plane. Therefore, either the drive direction x or the detection direction y becomes in agreement with the direction of the gravity.

Then, the vibrators 30 and 40 are placed in a state where the gravity 1G is added to the direction of vibration at all times. Therefore, the vibrators 30 and 40 are driven and vibrate in a state of being pulled by the gravity 1G in either one of the vibrating directions. Namely, the drive beams are differently deformed by the right and left vibrations, and the state of vibration becomes nonuniform.

Further, when the detection direction y is in agreement with the direction of the gravity, the vibrators 30 and 40 are deviated at all times from the geometrical centers, i.e., deviated from the positions of the vibrators of when they are stationary and free from the gravity. Therefore, the detection beams are deformed, and the driving vibration leaks in the detection direction y accounting for a cause of noise. Here, however, since a difference in the outputs of the detection electrodes is taken out, the noise in principle can be canceled.

SUMMARY OF THE INVENTION

The present invention was accomplished in view of the above-mentioned problems and has an object of realizing a suitably vibrating state of the vibrators in the vibration-type angular velocity sensor by canceling the displacement of the vibrators caused by the gravity.

To achieve the above object according to a first aspect, an angular velocity sensor comprises base portions, vibrators coupled to the base portions, exciting means for driving and vibrating the vibrators in a first direction (x), and detection means which, when an angular velocity is applied while the vibrators are being driven and vibrated, detects the angular velocity based on the vibrations of the vibrators in a second direction (y) at right angles with the first direction (x), the angular velocity sensor further comprising position adjusting means for so adjusting the positions of the vibrators as to cancel the amounts of displacement by which the vibrators are displaced by the gravity in the direction of the gravity when the detection axis (z) at right angles with the first direction (x) and with the second direction (y) is set to be in parallel with the horizontal plane and when the first direction (x) is set to be the vertical direction.

The position adjusting means work to so adjust the positions of the vibrators as to cancel the amounts of displacement by which the vibrators are displaced by the gravity in the direction of the gravity.

Therefore, the invention realizes a suitably vibrating state of the vibrators in the vibration-type angular velocity sensor by canceling the displacement of the vibrators caused by the gravity.

A second aspect is concerned with an angular velocity sensor of the above first aspect, wherein the exciting means apply drive voltages for driving and vibrating the vibrators to produce an electrostatic attraction, and the position adjusting means are constituted by monitor means for monitoring the vibrating state of the vibrators based on changes in the capacitances relative to the vibrators, and adjusting means for adjusting the DC components in the drive voltages produced by the exciting means based on the signals from the monitor means.

A third aspect is concerned with an angular velocity sensor of the above first or second aspect, wherein the vibrators include a first vibrator and a second vibrator coupled to the base portions respectively, and the position adjusting means are provided for the first vibrator and the second vibrator, respectively.

A fourth aspect is concerned with an angular velocity sensor of the above third aspect, wherein the exciting means drive and vibrate the first and second vibrators in the first direction (x) in opposite phases to each other.

BRIEF DESCRIPTION OF THE DRAWINGS

The above and other objects, features and advantages of the present invention will become more apparent from the following detailed description made with reference to the accompanying drawings.

DESCRIPTION OF THE PREFERRED EMBODIMENTS

Figure 1:
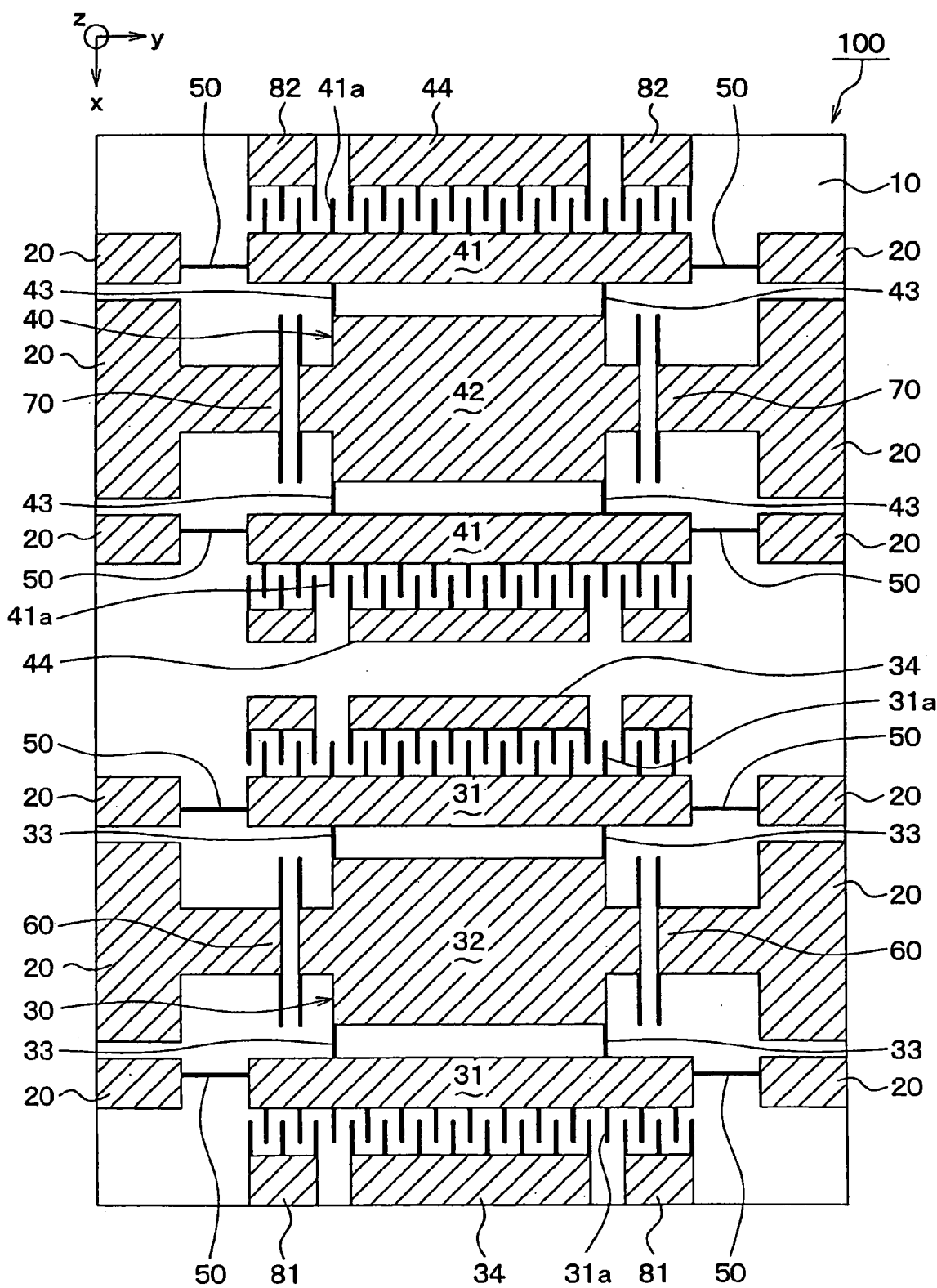
FIG. 1 is a diagram schematically illustrating the plane constitution of an angular velocity sensor according to a first embodiment.

An embodiment of the invention will now be described with reference to the drawings. In the following drawings, the same or equivalent portions are denoted by the same reference numerals to simplify the description.

Figure 2:
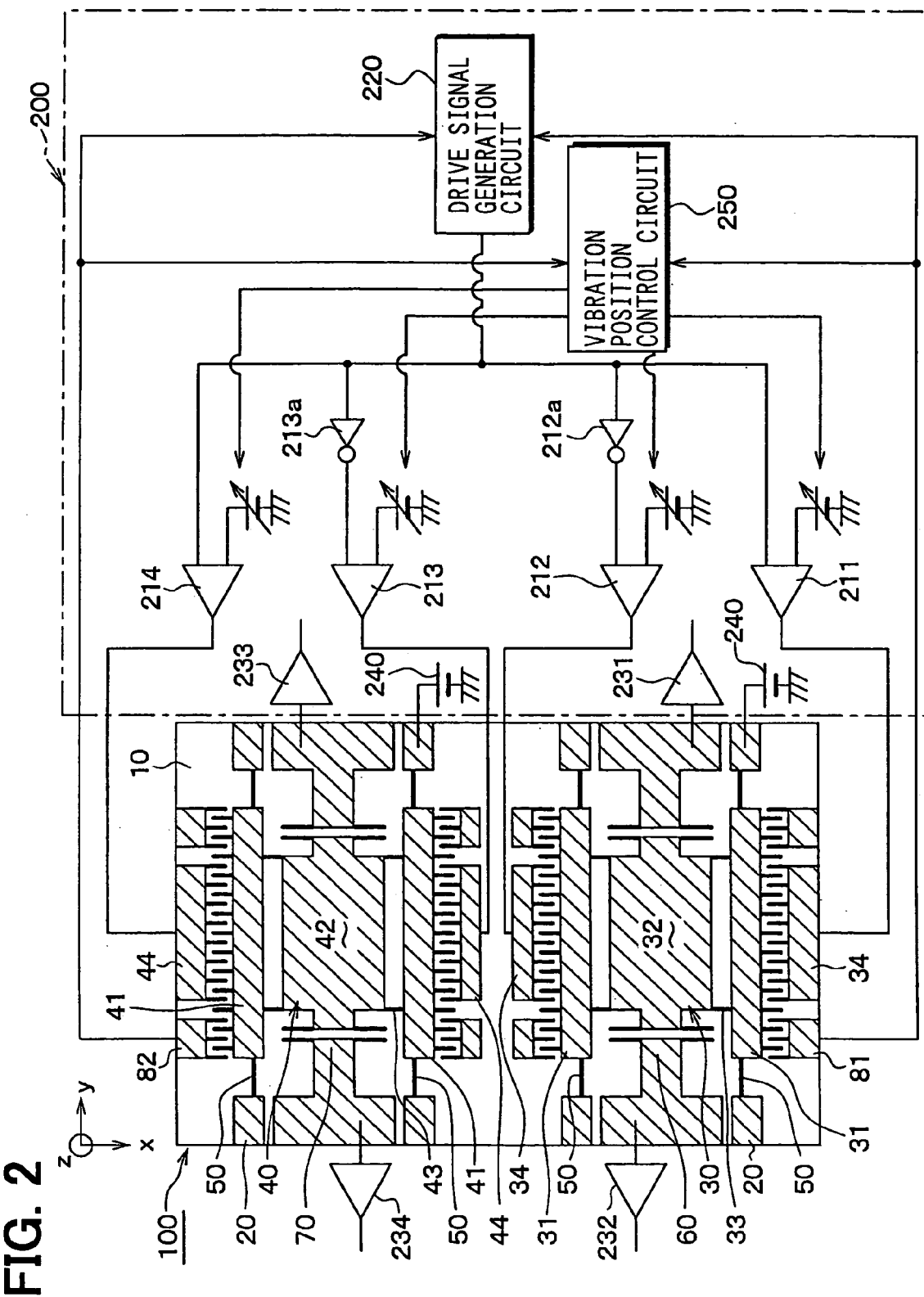
FIG. 2 is a diagram illustrating the constitution inclusive of a circuit portion in the angular velocity sensor of FIG. 1.

FIG. 1 is a diagram schematically illustrating the plane constitution of an angular velocity sensor 100 according to an embodiment of the invention, and FIG. 2 is a diagram illustrating the constitution inclusive of a circuit portion 200 in the angular velocity sensor 100. In FIGS. 1 and 2, the hatched areas are for convenient identification.

The angular velocity sensor 100 comprises a semiconductor substrate 10 such as a silicon substrate. Trenches are formed in the semiconductor substrate 10 relying upon a known semiconductor production technology such as etching to form base portions 20 on the outer peripheral portion thereof, and to form two vibrators 30 and 40 as well as electrodes on the inner peripheral portion thereof in a sectionalized manner.

The angular velocity sensor 100 has the vibrator that is constituted by the first vibrator 30 and the second vibrator 40 movably coupled to the base portions 20.

The circuit portion 200 is formed on another IC chip that is not shown, or is the one obtained by integrally forming elements such as transistors in the semiconductor substrate 10 that constitutes the angular velocity sensor 100 relying upon the semiconductor production technology. The connection to the circuit portion 200, base portions 20, vibrators 30, 40, and electrodes, can be accomplished by using the bonding wires or various wiring members.

The first vibrator (lower side in the drawing) 30 and the second vibrator (upper side in the drawing) 40 located on the inner periphery of the base portions 20, are symmetrical in shape to each other. In this embodiment, the two vibrators 30 and 40 are arranged along the x-direction (first direction) in FIG. 1, and are both movable relative to the base portions 20.

The two vibrators 30 and 40 are formed through the trench etching and, then, through the release etching in a manner of floating over the semiconductor substrate 10 other than the portions coupled to the base portions 20.

The two vibrators 30 and 40 include frame portions (first vibration portions) 31, 41, rectangular portions (second vibration portions) 32, 42 of nearly a rectangular shape positioned on the inside of the frame portions 31, 41, and detection beams 33, 43 for coupling the frame portions 31, 41 to the rectangular portions 32, 42. The two vibrators 30, 40 are supported at their frame portions 31, 41 being coupled to the base portions 20 through drive beams 50.

The drive beams 50 have a freedom in the x-direction (first direction) in FIG. 1 and, in this embodiment, have a shape extending in the y-direction so as to be resiliently deformed in the x-direction. The detection beams 33, 43 have a freedom in the y-direction (second direction) in FIG. 1 and, in this embodiment, have a shape extending in the x-direction so as to be resiliently deformed in the y-direction.

The first vibrator 30 and the second vibrator 40 have drive electrodes 34, 44 serving as exciting means provided on both sides of the vibrators 30, 40 along the x-direction for generating vibration for driving and vibrating the two vibrators 30, 40 in the x-direction in opposite phases to each other.

The drive electrodes 34, 44 assume the shape of comb teeth, and comb teeth portions 31a, 41a are formed on the frame portions 31, 41 of the vibrators 30, 40 facing the drive electrodes 34, 44 so as to be in mesh with the comb teeth portions of the drive electrodes 34, 44.

Though the operation will be described later, the drive electrodes 34, 44 serving as exciting means are constituted as described below.

The drive electrodes 34, 44 constitute the exciting means in the angular velocity sensor 100 together with the amplifiers 211, 212, 213, 214 and the drive signal generating circuit 220 in the circuit portion 200 shown in FIG. 2.

In the exciting means, drive voltages are applied to the drive electrodes 34 and 44 from the drive signal generating circuit 220 and the amplifiers 211 to 214. Here, the drive voltage is an AC voltage such as of a sine wave or a rectangular wave.

The vibrators 30 and 40 are provided, as shown in FIG. 1, with drive electrodes 34 and 44 on both the upper and lower sides, and are so constituted that AC voltages of opposite phases are applied to the drive electrodes 34, 44 of both sides.

Two amplifiers are provided for each of the vibrators 30, 40. Here, to generate AC voltages of opposite phases, the amplifiers 212, 213 of the one side are provided with inverters 212a, 213a.

Then, the vibrators 30 and 40 vibrate in the x-direction due to the electrostatic forces produced by the drive electrodes 33 and 44. Thus, the vibrators 30 and 40 are driven and vibrated. In this embodiment, further, the vibrators 30 and 40 are driven and vibrated in opposite phases.

Namely, while the first vibrator 30 is displaced upward in FIG. 1 along the x-direction, the second vibrator 40 is displaced downward in FIG. 1. Thus, the first and second vibrators 30, 40 are driven and vibrated in opposite phases to each other in order to cancel the acceleration component in the y-direction.

Referring to FIG. 1, further, the vibrators 30, 40 are provided with detection electrodes 60, 70 serving as detection means and coupled to the base portions 20 to detect the angular velocity.

The detection electrodes 60, 70 are so provided as to protrude from the base portions 20 and face the rectangular portions 32, 42 of the vibrators 30, 40. In this embodiment, the detection electrodes 60, 70 and the rectangular portions 32, 42 of the vibrators 30, 40 facing the detection electrodes 60, 70, are forming capacity portions facing each other in a parallel state.

Though the operation will be described later, the detection electrodes 60, 70 serving as detection means are constituted as described below.

The detection electrodes 60, 70 constitute detection means in the angular velocity sensor 100 together with the C/V converters 231, 232, 233, 234 in the circuit portion 200 shown in FIG. 2.

When the angular velocity is applied about the z-axis which is the detection axis in FIG. 1 while the vibrators 30, 40 are driven and vibrating, the detection means detects the angular velocity based on the vibrations of the vibrators 30, 40 in the y-direction at right angles with the x-direction.

Concretely, the capacitances vary between the detection electrodes 60, 70 and the rectangular portions 32, 42 of the vibrators 30, 40 facing the detection electrodes 60, 70 due to the vibrations of the vibrators 30, 40 in the y-direction. Variations in the capacitances are converted into voltages through the C/V converters 231 to 234, and are output.

Here, a differential output between the two C/V converters 231 and 232 in the first vibrator 30, is obtained and, besides, a differential output between the two C/V converters 233 and 234 in the second vibrator 40, is obtained. Further, a difference between these two differential outputs is obtained and is output as an angular velocity-signal. Therefore, due to the first and second vibrators 30 and 40 driven and vibrating in opposite phases relative to each other, there is obtained an angular velocity signal canceling the acceleration component in the y-direction.

Referring to FIG. 2, further, the circuit portion 200 of the angular velocity sensor 100 is provided with constant potential portions 240 for maintaining the vibrators 30, 40 at predetermined potentials. The constant potential portions 240 are electrically connected to the base portions 20 that are supporting the frame portions 31, 41 of the vibrators 30, 40.

As described above, an angular velocity sensor 100 of this embodiment basically comprises base portions 20, vibrators 30, 40 coupled to the base portions 20, exciting means 34, 44, 211 to 214, 220 for driving and vibrating the vibrators 30, 40 in the x-direction x, and detection means 60, 70, 231 to 234 which, when an angular velocity is applied about the z-axis while the vibrators 30, 40 are being driven and vibrated, detects the angular velocity based on the vibrations of the vibrators 30, 40 in a y-direction at right angles with the x-direction.

In this embodiment as shown in FIGS. 1 and 2, the angular velocity sensor 100 comprises position adjusting means 81, 82, 250 for so adjusting the positions of the vibrators 30, 40 as to cancel the amounts of displacement by which the vibrators 30, 40 are displaced by the gravity in the direction of the gravity when the detection axis z at right angles with the x-direction and with the y-direction is set to be in parallel with the horizontal plane and when the x-direction is set to be the vertical direction.

Concretely, in this embodiment, the exciting means applies drive voltages for driving and vibrating the vibrators 30, 40 to produce an electrostatic attraction, and the position adjusting means are constituted by monitor electrodes 81, 82 provided on the outer peripheral portion of the semiconductor substrate 10 and a vibrator position control circuit 250 provided in the circuit portion 200.

The monitor electrodes 81, 82 are constituted as monitor means for monitoring the vibrating state of the vibrators 30, 40 based upon changes in the capacitances between the vibrators 30 and 40. Here, the monitor electrodes 81, 82 assume the shape of comb teeth facing the comb teeth portions 31a, 41a of the frame portions 31, 41 of the vibrators 30, 40 so as to be in mesh therewith, and form capacitances relative to the opposing comb teeth portions 31a, 41a.

When the state of vibration of the vibrators 30, 40 changes while the vibrators 30, 40 are being driven and vibrated, capacitances vary between the vibrators 30, 40 and the monitor electrodes 81, 82. Signals representing changes in the capacitances of the monitor electrodes 81, 82 are sent to the vibrator position control circuit 250 as changes in the vibrating state of the vibrators 30, 40.

The vibrator position control circuit 250 is constituted as adjusting means for adjusting the DC components in the drive voltages produced by the exciting means in response to the signals from the monitor electrodes 81, 82.

Concretely, the vibrator position control circuit 250 adjusts the virtual ground (GND) of the amplifiers 211 to 214 in the exciting means to vary the DC components (direct-current components) in the drive voltages.

As described earlier, the electric connection of the circuit portion 200 to base portions 20, vibrators 30, 40, and electrodes, can be accomplished by using the bonding wires or various wiring members. Aluminum pads which are not shown are formed on the base portions 20, vibrators 30, 40 and electrodes, and the bonding wires or various wiring members are connected to the pads.

Described below is the operation of the angular velocity sensor 100. First, drive voltages are applied to the drive electrodes 34, 44 from the exciting means 33, 34, 211 to 214, 220. As described above, therefore, the first and second vibrators 30 and 40 are driven and vibrated in opposite phases to each other.

Concretely speaking, the vibrators 30 and 40 vibrate in the x-direction so as to approach, or separate away from, the drive electrodes 34, 44 due to the action of electrostatic force between the comb teeth portions of the drive electrodes 34, 44 and the comb teeth portions 31a, 41a of the vibrators 30, 40. In this case, the first vibrator 30 and the second vibrator 40 vibrate in the x-direction but reverse to each other (i.e., in reverse phases) since the AC components of the drive voltages are opposite in phase.

When an angular velocity is applied about the detection axis z, i.e., about the z-axis (see FIG. 1) while the two vibrators 30 and 40 are being driven and vibrated, the vibrators 30 and 40 receive Coriolis' forces opposite to each other in the y-direction. Then, due to the Coriolis' forces, the rectangular portions 32, 42 of the vibrators 30, 40 vibrate (detection of vibration) in the y-direction in opposite phases to each other due to the action of the detection beams 33 and 43.

In detecting the vibration, the capacitances of the detection electrodes 60, 70 corresponding to the vibrators 30, 40 vary depending upon the magnitude of the applied angular velocity (Coriolis' force). The variations in the capacitances are converted into voltages through the C/V converters 231 to 234. By obtaining the differential output as described above, the output from the detection means is obtained as an angular velocity signal.

According to the angular velocity sensor 100 as described above, the two vibrators 30 and 40 are driven and vibrated in opposite phases as described above to detect the detection signals of the angular velocity as a sum from the two vibrators 30 and 40 maintaining good sensitivity while canceling the external acceleration, which is an advantage. In the foregoing was described the basic operation for detecting the angular velocity of the angular velocity sensor 100.

Here, when the angular velocity sensor 100 is used for detecting, for example, the angular velocity about the axis in the back-and-forth direction, i.e., roll rate and the angular velocity about the axis in the right-and-left direction, i.e., pitch rate, either the drive direction x or the detection direction y becomes in agreement with the direction of the gravity. Therefore, the state of vibration of the vibrators 30 and 40 becomes nonuniform due to the gravity.

However, the angular velocity sensor 100 of this embodiment is provided with position adjusting means 81, 82, 250, and the vibrators 30 and 40 are placed in a suitably vibrating state despite the gravity applied in the x-direction (i.e., in the drive direction).

When the gravity is applied in the drive direction x, the vibrators 30 and 40 that are being driven and vibrated are displaced in the direction of the gravity, i.e., in the drive direction x by an amount of the gravity. Therefore, the vibrating state of the vibrators 30 and 40 that are being driven and vibrated, is varied by an amount of the displacement.

In this embodiment, the change in the vibrating state of the vibrators 30 and 40 is detected as signals representing changes in the capacitances of the monitor electrodes 81, 82, and the signals are sent to the vibrator position control circuit 250. In response to the signals from the monitor electrodes 81, 82, the vibrator position control circuit 250 adjusts the DC components in the drive voltages produced by the exciting means.

Concretely, though described above already, the vibrator position control circuit 250 adjusts the virtual ground (GND) of the amplifiers 211 to 214 in the exciting means to vary the DC components (direct-current components) in the drive voltages.

More concretely, if, for example, the gravity is applied downward in FIGS. 1 and 2, the vibrators 30 and 40 are similarly displaced downward.

A change in the state of vibration is monitored by the monitor electrodes 81, 82, and the vibrator position control circuit 250 adjusts the virtual GND of the amplifiers 212, 214 corresponding to the drive electrodes 34, 44 on the upper side in the drawing of the vibrators 30, 40, to increase the DC components in the drive voltages for the drive electrodes 34, 44 corresponding to the amplifiers 212, 214.

Even when the gravity is exerted downward in FIGS. 1 and 2, therefore, the centers of vibration of the vibrators 30 and 40 return to the positions of the vibrators of when they are stationary, i.e., when no gravity is applied thereto. Thus, the positions of the vibrators 30, 40 are adjusted; i.e., the vibrators 30, 40 are properly driven and vibrated without losing uniformity.

According to the embodiment as described above, there is provided an angular velocity sensor 100 comprising base portions 20, vibrators 30, 40 coupled to the base portions 20, exciting means 34, 44, 211 to 214, 220 for driving and vibrating the vibratos 30, 40 in the x-direction, and detection means 60, 70, 231 to 234 which, when an angular velocity is applied while the vibrators 30, 40 are being driven and vibrated, detects the angular velocity based on the vibrations of the vibrators 30, 40 in the y-direction at right angles with the x-direction, the angular velocity sensor 100 further comprising position adjusting means 81, 82, 250 for so adjusting the positions of the vibrators 30, 40 as to cancel the amount of displacement by which the vibrators 30, 40 are displaced by the gravity in the direction of the gravity when the detection axis z at right angles with the x-direction and with the y-direction is set to be in parallel with the horizontal plane and when the x-direction is set to be the vertical direction.

The position adjusting means 81, 82, 250 work to so adjust the positions of the vibrators 30, 40 as to cancel the amount of displacement by which the vibrators 30, 40 are displaced by the gravity in the direction of the gravity.

Therefore, the embodiment realizes a suitably vibrating state of the vibrators 30, 40 in the vibration-type angular velocity sensor 100 by canceling the displacement of the vibrators 30, 40 caused by the gravity.

Here, in this embodiment, the exciting means 34, 44, 211 to 214, 220 apply drive voltages for driving and vibrating the vibrators 30, 40 to produce an electrostatic attraction, and the position adjusting means are constituted by monitor means 81, 82 for monitoring the vibrating state of the vibrators 30, 40 based on changes in the capacitances relative to the vibrators 30, 40, and adjusting means 250 for adjusting the DC components in the drive voltages produced by the exciting means 34, 44, 211 to 214, 220 based on the signals from the monitor means 81, 82.

In this embodiment, further, the vibrators include a first vibrator 30 and a second vibrator 40 coupled to the base portions 20, and the position adjusting means 81, 82, 250 are provided for the first vibrator 30 and the second vibrator 40, respectively.

Modified Embodiments

As described above, the angular velocity sensor 100 of the embodiment is capable of realizing a suitably vibrating state of the vibrators 30 and 40 by canceling the displacement of the vibrators 30 and 40 caused by the gravity when it is used for detecting the roll rate and the pitch rate.

However, when the angular velocity sensor 100 is used in an environment in which the gravity is applied in a predetermined direction at all times, the amount of displacement of the vibrators 30, 40 is determined by the gravity. Therefore, the amount of displacement may be estimated in advance to so adjust the DC components in the drive voltages produced by the exciting means 34, 44, 211 to 214, 220 as to be constant. In this case, there is required no monitor means which works as position adjusting means.

Figure 3A:
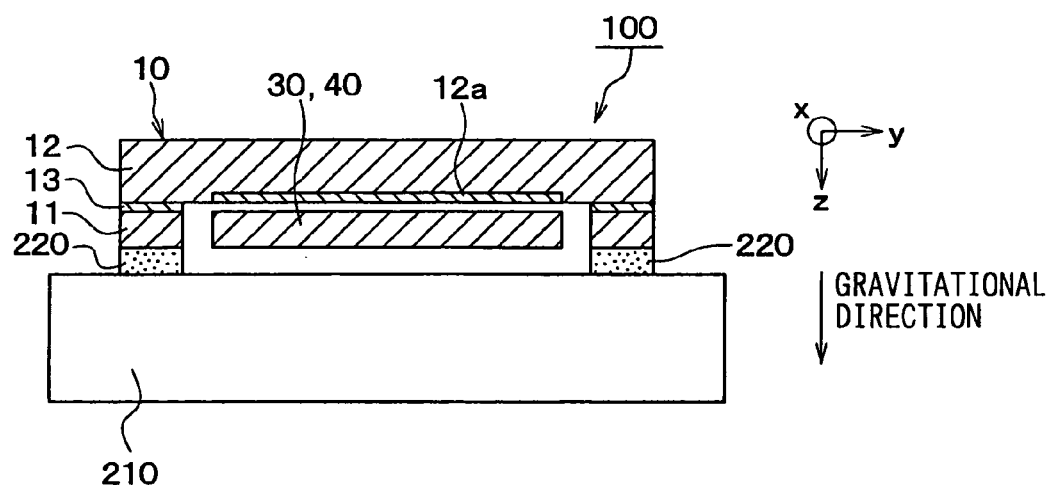
FIGS. 3A–3B is a schematic sectional view illustrating the constitution of the angular velocity sensor according to a modified embodiment.

As an example thereof, there can be employed a method of canceling the effect of the gravity in the direction of the detection axis z. Referring to FIG. 3A, the angular velocity sensor 100 is realized by using an SOI substrate as a semiconductor substrate 10 which is obtained by sticking a pair of silicon substrates 11 and 12 together via an oxide film (insulating layer) 13, and by forming the base portions 20, vibrators 30, 40 and electrodes on one silicon substrate 11.

In this case, the other silicon substrate 12 is constituted as a support substrate 12 for supporting various portions in the angular velocity sensor 100.

Referring to FIG. 3A, the angular velocity sensor 100 is mounted, via a junction member 220, on a circuit chip 210 with the silicon substrate 11 on which the vibrators 30, 40 are formed as the lower side. Namely, the mounting is effected in a flip-chip form. In this case, the sensor works to detect the yaw rate which is an angular velocity in the vertical direction, i.e., about the z-axis.

Here, the junction member 220 is an electrically conducting member when an electric connection must be accomplished or may be an electrically nonconducting material when no electric connection is necessary. On the circuit chip 210, there is formed the circuit portion 200 of the angular velocity sensor 100.

In the case of the structure shown in FIG. 3A, the upper side in the drawing is the top, the lower side is the earth, and the gravity acts in a direction from the semiconductor substrate 10 toward the circuit chip 210. Namely, the gravity acts on the vibrators 30, 40 at all times.

Figure 3B:
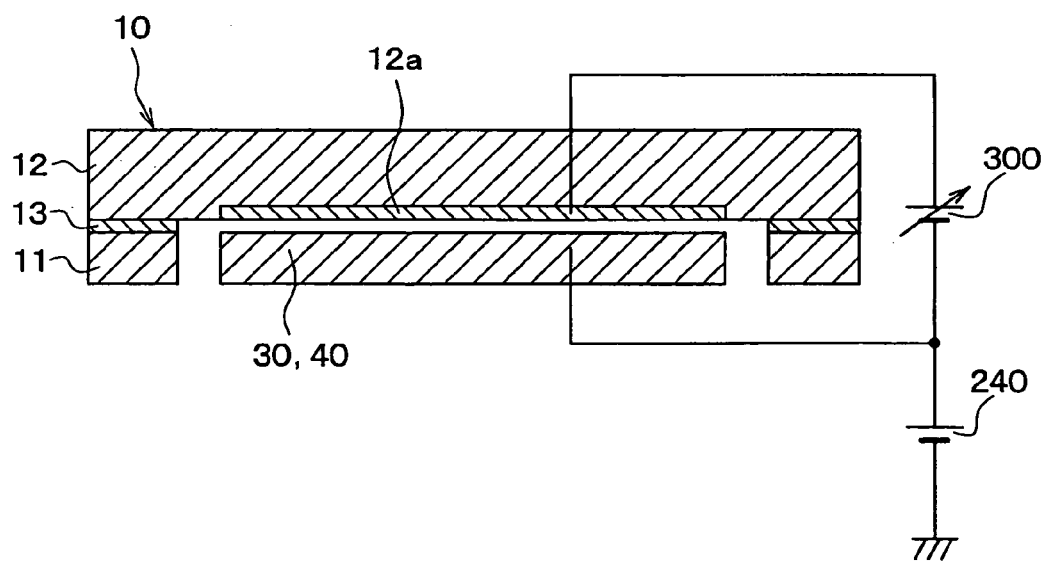
Figure 4:
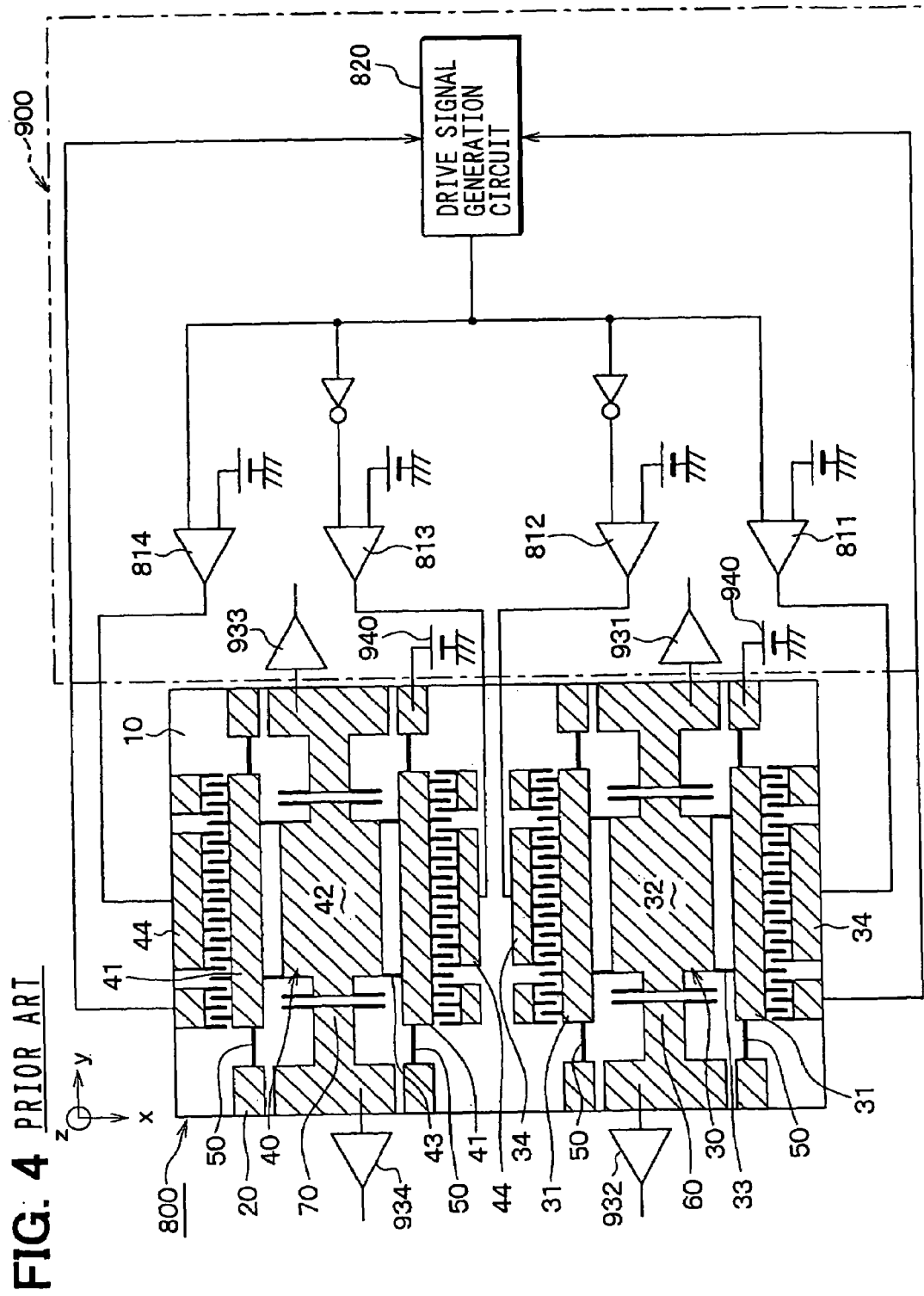
FIG. 4 is a diagram illustrating the constitution inclusive of a circuit portion in a general angular velocity sensor of this kind.

In a state where the gravity is acting as described above, as shown in FIG. 3B, a back-surface electrode 12a is formed on the semiconductor substrate 10 on the back side of the vibrators 30, 40 facing the support substrate 12, i.e., formed on the other silicon substrate 12 of the semiconductor substrate 10, and a variable voltage source 300 is provided between the back-surface electrode 12a and the vibrators 30, 40 to apply a DC bias thereto.

Here, the back-surface electrode 12a can be constituted as a conductor layer comprising a diffused layer or a buried film.

The variable voltage source 300 is constituted as position adjusting means for adjusting the positions of the vibrators 30, 40 so as to cancel the amount of displacement by which the vibrators 30, 40 are displaced in the direction of the gravity due to the gravity.

Concretely, the gravity is applied to the vibrators 30, 40 toward the earth at all times. By estimating the amount of displacement by which the vibrators 30, 40 are displaced toward the earth due to the gravity, therefore, a predetermined DC bias is applied to the vibrators 30, 40 from the variable voltage source 300 so as to lift up the vibrators 30, 40 toward the top side.

As described above, the angular velocity sensor 100 of this modified embodiment, too, is capable of realizing a suitably vibrating state of the vibrators 30, 40 by canceling the displacement of the vibrators 30, 40 caused by the gravity.

(Other Embodiments)

In the above embodiments, the vibrator comprises the first vibrator 30 and the second vibrator 40 coupled to the base portions 20, respectively. However, there may be employed only one vibrator or three or more vibrators.

In the above embodiments, further, the position adjusting means is the one for adjusting the positions of the vibrators relying upon the electrostatic force. However, the method of adjusting the positions of the vibrators is not limited to the one that relies upon the electrostatic force.

In an angular velocity sensor which electromagnetically drives the vibrator, for example, the positions of the vibrators may be adjusted relying upon the electromagnetic force. In the angular velocity sensor using piezo elements as vibrators, further, the positions of the vibrators may be adjusted by applying a voltage to the piezo elements.

In short, the present invention deals with an angular velocity sensor comprising, as major portions, base portions, vibrators coupled to the base portions, exciting means for driving and vibrating the vibrators in the first direction, and detection means which, when an angular velocity is applied while the vibrators are being driven and vibrated, detects the angular velocity based on the vibrations of the vibrators in a second direction at right angles with the first direction, the angular velocity sensor further comprising position adjusting means for so adjusting the positions of the vibrators as to cancel the amount of displacement by which the vibrators are displaced by the gravity in the direction of the gravity. Other portions may be suitably designed and modified.

What is claimed is:

1. An angular velocity sensor comprising:
   base portions;
   vibrators coupled to said base portions;

exciting means for driving and vibrating said vibrators in a first direction; and detection means which, when an angular velocity is applied while said vibrators are being driven and vibrated, detects the angular velocity based on the vibrations of said vibrators in a second direction at right angles with said first direction;

said angular velocity sensor further comprising position adjusting means for so adjusting the positions of said vibrators as to cancel the amount of displacement by which said vibrators are displaced by the gravity in the direction of the gravity when the detection axis at right angles with said first direction and said the second direction is set to be in parallel with the horizontal plane and when said first direction is set to be the vertical direction.

2. An angular velocity sensor according to claim 1, wherein:

said exciting means apply drive voltages for driving and vibrating the vibrators to produce an electrostatic attraction; and said position adjusting means are constituted by monitor means for monitoring the vibrating state of said vibrators based on changes in the capacitances relative to said vibrators and adjusting means for adjusting the DC components in the drive voltages produced by said exciting means based on the signals from said monitor means.

3. An angular velocity sensor according to claim 1, wherein:

said vibrators include a first vibrator and a second vibrator coupled to said base portions; and said position adjusting means are provided for said first vibrator and said second vibrator, respectively.

4. An angular velocity sensor according to claim 3, wherein said exciting means drive and vibrate said first and second vibrators in said first direction in opposite phases to each other.

* * * * *